US008652703B2

(12) United States Patent
Zahid et al.

(10) Patent No.: US 8,652,703 B2
(45) Date of Patent: Feb. 18, 2014

(54) PRODUCTION OF SELF-SUPPORTING CERAMIC MATERIALS HAVING A REDUCED THICKNESS AND CONTAINING METAL OXIDES

(75) Inventors: Mohsine Zahid, Ruedesheim Am Rhein (DE); Mathilde Rieu, Toulouse (FR); Claude Estournes, Rieumes (FR); Pascal Lenormand, Toulouse (FR); Florence Ansart, Labege (FR)

(73) Assignees: Electricite de France, Paris (FR); Universite Paul Sabatier Toulouse III, Paris (FR)

( * ) Notice: Subject to any disclaimer, the term of this patent is extended or adjusted under 35 U.S.C. 154(b) by 237 days.

(21) Appl. No.: 13/377,880

(22) PCT Filed: Jun. 16, 2010

(86) PCT No.: PCT/FR2010/051204
§ 371 (c)(1),
(2), (4) Date: Dec. 13, 2011

(87) PCT Pub. No.: WO2010/146311
PCT Pub. Date: Dec. 23, 2010

(65) Prior Publication Data
US 2012/0094214 A1    Apr. 19, 2012

(30) Foreign Application Priority Data

Jun. 19, 2009 (FR) ...................... 09 54168

(51) Int. Cl.
*H01M 8/10* (2006.01)
(52) U.S. Cl.
USPC ............ 429/479; 429/486; 429/491; 429/496
(58) Field of Classification Search
USPC ................... 429/479, 486, 491, 496
See application file for complete search history.

(56) References Cited

U.S. PATENT DOCUMENTS 7,494,557 B1    2/2009   Peterson

FOREIGN PATENT DOCUMENTS

| EP | 1 043 149 A2 | 10/2000 |
| JP | 7073891 A | 3/1995 |
| WO | WO 2004/083147 | 9/2004 |

OTHER PUBLICATIONS

Bernard-Granger, et al. "Spark plasma sintering of a commercially available granulated zirconia powder: I. Sintering path and hypotheses about the mechanism(s) controlling densification", *Acta Materialia*, vol. 55, pp. 3493-3504 (2007).

(Continued)

*Primary Examiner* — Jane Rhee
(74) *Attorney, Agent, or Firm* — Vedder Price P.C.; Thomas J. Kowalski

(57) ABSTRACT

The present invention relates to a method for manufacturing a metal-oxide-based ceramic, including, in order, the step of inserting, into a flash sintering device, a nanocrystalline powder comprising crystallites and crystallite agglomerates of a ceramic of formula, $Zr_{1-x}M_xO_2$, where M is chosen from yttrium, scandium and cerium, or $Ce_{1-x}M'_xO_2$, where M' is chosen from gadolinium, scandium, samarium and yttrium, where x lies between 0 and 0.2, the powder having an average crystallite size of between 5 and 50 nm, an average crystallite agglomerate size of between 0.5 and 20 μm, and a specific surface area of between 20 and 100 $m^2/g$. The invention further includes the step of flash sintering the powder by applying a pressure of between 50 and 150 MPa, at a temperature of between 850° C. and 1400° C., for a time of between 5 and 30 minutes.

18 Claims, 1 Drawing Sheet

(56) References Cited

OTHER PUBLICATIONS

Bernard-Granger, et al. "Spark plasma sintering of a commercially available granulated zirconia powder: II. Microstructure after sintering and ionic conductivity", *Acta Materialia*, vol. 56, pp. 4658-4672 (2008).

Chakravarty et al. "High strength porous alumina by spark plasma sintering", *Journal of the European Ceramic Society*, vol. 29, pp. 1361-1369 (2009).

Mori et al. "Design of high quality doped $CeO_2$ solid electrolytes with nanohetero structure", *Nukleonika*, vol. 51 (Supplement 1), pp. S11-S18 (2006).

Muroi et al. "Preparation of nano-grained zirconia ceramics by low-temperature, low-pressure spark plasma sintering" *J Mater Sci*, vol. 43, pp. 6376-6384 (2008).

Okamoto et al. "Phase transition and electrical conductivity of Scandia-stabilized zirconia prepared by spark plasma sintering process" *Solid State Ionics*, vol. 176, pp. 675-680 (2005).

Suzuki et al. "Flexural strength of $Y_2O_3$-TZP ceramics produced by sheet molding", *Ceramics International*, vol. 19, pp. 141-149 (1993).

Takeuchi et al. "Improvement of mechanical strength of 8 mol % Yttria-Stabilized zirconia ceramics by spark-plasma sintering" *Journal of the Electromechanical Society*, vol. 149 (4); pp. A455-A461 (2002).

International Search Report and Written Opinion received in PCT/FR2010/051204.

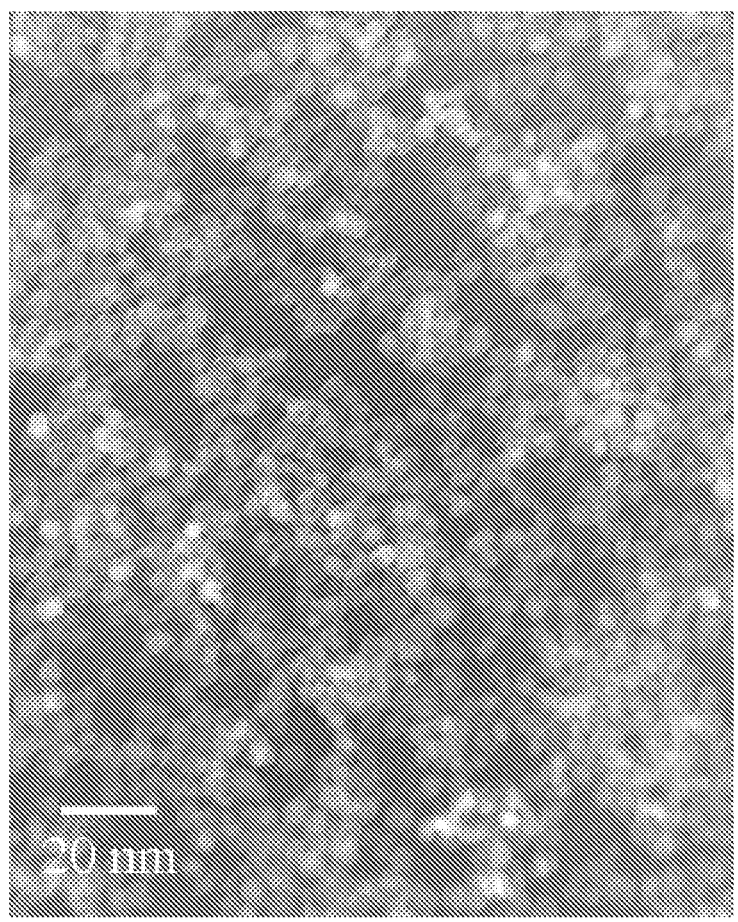

PRODUCTION OF SELF-SUPPORTING CERAMIC MATERIALS HAVING A REDUCED THICKNESS AND CONTAINING METAL OXIDES

RELATED APPLICATIONS

The present application is filed pursuant to 35 U.S.C. §371 as a U.S. National Phase application of International Patent Application No. PCT/FR2010/051204, which was filed on Jun. 16, 2010, claiming the benefit of priority to French Patent Application No. FR 0954168 filed on Jun. 19, 2009. The entire content of each of the aforementioned applications is incorporated herein by reference in its entirety.

The present invention relates to the manufacture of thin, dense, self-supporting ceramics based on zirconium oxides or cerium oxide and to the use of such ceramics as solid electrolytes in fuel cells.

Ceramic technology is at the present time a subject of great interest because ceramics are enablers and/or essential components for future applications. For example, ceramics are used in certain fuel cells that currently represent one of the most promising technologies in the power generation field (SOFC, PCFC, high-temperature electrolysis cells).

A fuel cell is an electrochemical conversion system that allows the chemical energy contained in a fuel, for example hydrogen or a source of hydrogen, to be converted into electrical power, and heat as a by-product. Currently, the two main fuel-cell technologies are solid oxide fuel cells (SOFCs) and proton exchange membrane fuel cells (PEMFCs). SOFCs are potentially more advantageous than PEMFCs because of their high total-energy efficiency, which is generally about 80 to 90%. However, they require high operating temperatures, of about 750° C. to 1000° C., which means that ceramic electrolytes must be used. The ceramics are advantageously based on zirconia, optionally stabilized with a metal M, $(Zr_{1-x}M_xO_2)$, where M is chosen from yttrium, scandium and cerium, or based on ceria, optionally stabilized with a metal M', $(Ce_{1-x}M'_xO_2)$, where M' is chosen from gadolinium, scandium, samarium and yttrium.

SOFC performance is improved by reducing the thickness of this solid electrolyte, for the following reasons:

the electrical efficiency of a cell is in part governed by the resistance of the electrolyte. This specific resistance is expressed by $R=(r \times e)/A$, where r denotes the resistivity of the electrolyte, e its thickness and A its area. The thinner the electrolyte, the better the electrical efficiency of the cell;

for equal energy efficiency, reducing the thickness of the electrolyte makes it possible to lower the operating temperature of the cell, and a lower temperature results in the cell having a longer lifetime;

thinning the ceramic electrolyte of the cell makes it possible to reduce the size and weight of the cell; and finally ceramics are very expensive. Reducing the amount of ceramic makes it possible to obtain cost levels that are economically acceptable for mass-market applications.

To meet this need, 3$^{rd}$ generation SOFCs have provided a first technical solution: they comprise a mechanical support made of metal on which thin layers of active materials are deposited. The metal support, which is a very good conductor of heat and electricity, prevents any temperature non-uniformity within the cell and ensures that the current can be easily collected. Resistance to temperature cycles is improved by the good mechanical integrity and good heat conduction. The mechanical support is easy to solder or to connect and it could also be used for internally reforming methane. The drawback of the technology lies however in the deposition of the solid electrolyte on the metal: after deposition using conventional techniques such as tape casting or screen printing, densification of the ceramic requires a high-temperature (1600° C.) sintering step that the metal support cannot withstand.

A particularly advantageous alternative to this solution consists in providing a very thin, self-supporting electrolyte having sufficient strength for it to be possible to deposit the other components of the cell thereon. This requires production, via perfectly controlled densification, of very thin, extremely dense ceramics having an area ranging from a few square centimeters to several tens of square centimeters, which ceramics can be handled and have sufficient strength.

Certain scientific publications describe attempts to synthesize such ceramics. Mention may in particular be made of the article by G. Bernard-Granger and C. Guizard "Spark plasma sintering of a commercially available granulated zirconia powder: I. Sintering path and hypotheses about the mechanism(s) controlling densification" *Acta Materialia* 55 (2007), pp 3493-3504. This article describes a method for manufacturing a metal-oxide-based ceramic by flash sintering. The powder used in this method is a commercially available zirconia powder containing crystallites of large average diameter, between 50 and 70 nm, and crystallite aggregates of large size, between 10 and 80 µm, and having a low specific surface area of only 16.4 m$^2$/g. The ceramics obtained are pellets having a diameter of 8 mm (i.e. a surface area of only about 0.5 cm$^2$) and a thickness of 1.6 mm. These results are not good enough for the envisaged applications and it would be desirable to obtain ceramics having a thickness of 200 µm or less for an area of at least 1 cm$^2$. A wafer with these dimensions would not be strong enough if obtained by the method described in the article by G. Bernard-Granger and C. Guizard.

As far as is known by the applicant, such ceramics, which are at the same time dense, impermeable to gases and liquids, very thin and of large area and sufficient mechanical stability, have not hitherto been described in the literature, and the production of ceramics based on $Zr_{1-x}M_xO_2$, where M is chosen from yttrium, scandium and cerium, or based on $Ce_{1-x}M'_xO_2$, where M' is chosen from gadolinium, scandium, samarium and yttrium, which can be used as self-supporting electrolytes in SOFCs still remains a challenge.

To their credit, the applicant company has developed a method for manufacturing such self-supporting oxides.

The novelty of the method of the present invention lies in the use of a nanocrystalline powder having very particular technical properties in a method that has up to now been little used, i.e. flash sintering. Similar to high-pressure sintering, the technique called flash sintering, or spark plasma sintering (SPS), is extremely effective for forming any type of material (metals, ceramics, polymers and composites thereof). The applicant has discovered that using this technique with a nanocrystalline powder having a particular microstructure, in particular characterized by the presence of loosely compacted agglomerates and by a high specific surface area, makes it possible to obtain, by flash sintering, ceramics that are dense, impermeable to fluids, extremely thin and of good strength.

One subject of the present invention is therefore a method for manufacturing a metal-oxide-based ceramic, comprising, in order, the following steps:

(a) inserting, into a flash sintering device, a nanocrystalline powder comprising crystallites and crystallite agglomerates of a $Zr_{1-x}M_xO_2$ ceramic, where M is chosen from yttrium, scandium and cerium, or of a $Ce_{1-x}M'_xO_2$ ceramic, where M' is chosen from gadolinium, scandium, samarium and yttrium, where x lies between 0 and 0.2, said powder having:

an average crystallite size, measured by X-ray diffraction, of between 5 and 50 nm (nanometers), an average crystallite aggregate size, measured using a scanning electron microscope (SEM), of between 0.5 and 20 μm (microns), a specific surface area, measured by nitrogen absorption (BET method), of between 20 and 100 m²/g; and (b) flash sintering said powder by applying a pressure of between 50 and 150 MPa, at a temperature of between 850° C. and 1400° C., for a time of between 5 and 30 minutes.

The nanocrystalline powder that is used in the first step (a) of this method is a powder mainly consisting of particles of a ceramic of formula:

$Zr_{1-x}Y_xO_2$,

$Zr_{1-x}Sc_xO_2$,

$Zr_{1-x}Ce_xO_2$,

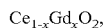
$Ce_{1-x}Gd_xO_2$,

$Ce_{1-x}Sc_xO_2$,

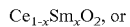
$Ce_{1-x}Sm_xO_2$, or

$Ce_{1-x}Y_xO_2$ where x lies between 0 and 0.2.

These optionally stabilized zirconium or cerium oxides are chosen for their ability to form, especially by virtue of their good ion conductivity, good solid electrolytes for SOFCs.

The weight percentage of said optionally stabilized nanocrystalline zirconia or cerium particles in the sintered ceramic will preferably be higher than 90%, or higher than 95% and even higher than 98%.

This nanocrystalline powder comprises individual crystallites and crystallite agglomerates. It is characterized by its particle size distribution:

an average crystallite size, measured by X-ray diffraction, lies between 5 and 50 nm, preferably between 10 and 40 nm and even more preferably between 15 and 35 nm;

an average crystallite agglomerate size, measured using a scanning electron microscope (SEM), lies between 0.5 and 20 μm, preferably between 0.6 and 15 m and even more preferably between 0.7 and 10 μm; and a specific surface area, measured by nitrogen absorption (BET method), lies between 20 and 100 m²/g, preferably between 30 and 90 m²/g and even more preferably between 40 and 80 m²/g.

The size of the crystallites is measured by X-ray diffraction.

The size of the crystallite aggregates may be measured by observing the powder under a scanning electron microscope (SEM).

Lastly, the powder is characterized by its specific surface area. This specific surface area is conventionally measured by nitrogen absorption, according to the BET method.

The oxide powder thus described has a high specific surface area, which means that it has a relatively high volume when placed in the flash-sintering mould, relative to its final volume after compression. This high volume makes it easier to spread the powder bed evenly before the compression forming and guarantees that the final self-supporting ceramic wafer has a good thickness uniformity even for samples having areas of the order of several square centimeters.

Preferably the powder particles are furthermore essentially spherical. This shape makes it easy for the particles to slide relative to one another when they are compressed and form a dense and solid ceramic.

The flash sintering is carried out in step (b) of the method according to the invention. For a detailed description of this relatively recent technique, the reader may refer, for example, to dossier IN 56 of the Éditions Techniques de l'Ingénieur (September 2006). Generally speaking, the material in pulverulent form is inserted, preferably without a sintering aid, into the compression chamber, for example a mould with a graphite piston that makes it possible to apply a uniaxial pressure during the heating cycle of the sinter. The major difference between conventional hot pressing and flash sintering lies in the fact that the heat is not supplied by an external heat source but by virtue of a DC, pulsed-DC or AC current applied via electrodes connected to the mould. This current flows through the conductive pressing chamber and also through the sample when the latter is electrically conductive.

It is advantageous to apply a uniaxial pressure because, during the flash sintering, the dimensions of the part only change in the direction in which the compressing force is applied. After it has cooled, the lateral dimensions of the densified ceramic will therefore be identical to the dimensions of the mould. Applying a uniaxial pressure during the sintering cycle furthermore makes it possible to prevent all the undesirable deformation effects observed when sintering thin objects using conventional techniques.

Controlled parameters of the flash sintering step are the pressure and the temperature inside the chamber and the duration of the step. According to the method of the invention:

the pressure lies between 50 and 150 MPa, preferably between 80 and 120 MPa, and in particular between 90 and 110 MPa;

the temperature lies between 850° C. and 1400° C., preferably between 1000 and 1300° C., and in particular between 1100 and 1250° C.; and the total duration of the step lies between 5 and 30 minutes, preferably between 10 and 30 minutes, and in particular between 15 and 25 minutes.

As regards the magnitude of the applied current, the latter has to be adjusted depending on the size of the mould used: the larger the mould, the higher the current to be applied. By way of indication, the current will possibly lie between 1000 and 4000 A for a cylindrical mould with a diameter of 5 cm.

The flash sintering technique makes it possible to substantially increase the sintering rate and thus obtain, in a very short time, highly densified materials, while limiting grain growth. It also makes it possible to associate various materials while limiting their reaction, and to sinter at relatively low temperatures solids that are unstable at high temperatures.

This absence of reaction is particularly useful in a particularly preferred embodiment of the method of the present invention in which a plurality of thin ceramic wafers are sintered simultaneously, the wafers being separated from one another by separating sheets. This embodiment is possible not only due to the small thickness of the prepared objects, but in particular because of the relatively low sintering temperature and the short sintering time which prevent or limit any reaction between the ceramic to be compressed and the material forming the intermediate separation sheets.

In this particularly advantageous embodiment of the method of the invention, step (a) comprises inserting a plurality of powder layers into the flash sintering device, the various layers being separated from one another by a separating sheet capable of withstanding the thermal and mechanical conditions of the sintering step (b), so as to obtain, after the sintering step (b), a multilayer of a number of ceramic wafers and separating sheets arranged in alternation.

After sintering, the multilayer is removed from the mould and the multilayer, consisting of wafers of densified ceramic and of separating sheets, is subjected to a step of removing the separating sheets. This step may be a thermal and/or chemical treatment of the multilayer. This treatment must make the separating sheets selectively disappear without however attacking or impairing the ceramic.

The separating sheets are preferably graphite sheets and the removal step then comprises, for example, treating the sintered multilayer in air at a temperature of between 700 and 900° C. for a time of between 30 and 120 minutes.

In this preferred embodiment, the method according to the invention thus makes it possible to produce a number of ceramics simultaneously over a time scale that does not exceed a few minutes. The extremely short sintering time relative to conventional sintering methods, in combination with simultaneous compression of a number of wafers, makes it possible to envisage a drastic reduction in the manufacturing costs and mass production of planar ceramic objects.

Nanocrystalline powders having the technical characteristics described above are not or are still not commercially available, but can be prepared relatively simply using known sol-gel methods. It should however be noted that the method of the present invention is in no way limited to the use of nanocrystalline powders synthesized by the sol-gel methods described below, or in general by the sol-gel route.

The method of the present invention may therefore comprise the steps required to manufacture the nanocrystalline metal-oxide powder used in step (a).

In the particular embodiment, the method of the present invention therefore furthermore comprises, before step (a) of inserting the nanocrystalline powder, an additional step consisting in synthesizing said powder using a sol-gel technique.

To obtain a nanocrystalline powder having the physical and chemical properties as defined in the invention, it is necessary to judiciously choose suitable synthesis conditions.

There are two main sol-gel synthesis techniques that are suitable and allow production of nanocrystalline powders such as those described above.

In a first variant, the nanocrystalline powder is synthesized from an acidic aqueous solution of zirconium salts, optionally mixed with yttrium, scandium or cerium salts, or from an acidic aqueous solution of cerium salts, optionally mixed with gadolinium, scandium, samarium or yttrium salts, said solution furthermore containing hexamethylenetetramine (HMTA) and acetylacetone (ACAC).

In a first step, an acidic aqueous solution is prepared containing at least three constituents, namely:

a) at least one zirconium salt, optionally mixed with a yttrium, scandium or cerium salt, or at least one cerium salt, optionally mixed with a gadolinium, scandium, samarium or yttrium salt, in the dissolved state;

b) at least one mixture of hexamethylenetetramine (HMTA) and acetylacetone (ACAC) in a molar ratio of HMTA to ACAC of between 0.9/1 and 1.1/1; and c) an organic or mineral acid in an amount sufficient to obtain a pH of between 2 and 6.

The salt is preferably a nitrate or an oxychloride, and it will be introduced in a concentration of between 0.05 and 0.5 $mol.L^{-1}$.

The HMTA and ACAC are each preferably used in a concentration ranging from 0.25 to 1.5 $mol.L^{-1}$.

The acid is preferably an organic acid chosen from acetic acid, propanoic acid and trifluoroacetic acid.

In a second step, this solution is heated to a temperature of between 50° C. and 100° C., preferably between 60° C. and 90° C., and even more preferably between 70° C. and 80° C. The solution is then observed to gel, the gelling being attributed to the polymerization of the HMTA and the ACAC. Throughout this gelling step, the metal salts are in the form of coordination complexes with the HMTA and ACAC reactants. The initial concentrations of reactants and the heating conditions (temperature and duration) are preferably adjusted so that, at the end of the gelling step, the gel obtained has a Brookfield viscosity, measured at 25° C., of between 20 and 80 mPa·s. This is generally the case, when the solution is heated to the temperatures indicated above for a period of heating between 10 and 60 minutes.

The gel obtained is then subjected to a heat treatment at a temperature of 400° C. or higher, for a time of between 6 and 8 hours, so as to produce an amorphous powder free of any organic residue.

Said amorphous powder is then calcined at a temperature of between 500° C. and 1000° C., for a time of at least 2 hours, and thus converted into the desired nanocrystalline metal-oxide powder.

Another sol-gel synthesis route that allows nanocrystalline powders that can be used in the present invention to be produced is the more conventional route that starts, not with zirconium or cerium metal salts, but with alkoxides of these metals.

This route comprises, as is known, preparing a sol containing all the reactants, hydrolyzing the alkoxy functional groups and condensing the active metal-OH functional groups thus freed and then a step in which the solution is left to form a gel that will then be appropriately dried.

By way of example, sol-gel synthesis of a nanocrystalline powder of yttriated zirconia is described here:

Firstly a solution of a tetraalkoxyzirconium compound and an yttrium salt, for example yttrium nitrate, is prepared in an organic solvent. The alkoxy groups are generally $C_{1-6}$, preferably $C_{3-4}$, alkoxy groups, the latter having a particularly appropriate reaction rate. The organic solvent used is preferably that corresponding to the alcohol freed by hydrolysis of the alkoxy groups. It is most particularly preferred to use tetra(n-propoxy)zirconium in solution in n-propanol. The initial concentration of the tetraalkoxyzirconium compound generally lies between 0.01 and 1 $mol.L^{-1}$. The solution is prepared under an inert atmosphere, the alkoxide being very reactive with regard to moisture in the air.

The solution will also contain a certain amount of a chelating agent such as acetylacetone or acetic acid. This chelating agent is essential to the formation of a uniform sol and mainly serves to prevent a solid precipitate from forming when water is added. The ratio of the number of moles of chelating agent to the number of moles of zirconium and yttrium atoms present in the solution (=the complexation ratio) preferably lies between 0.1 and 1.

Next, a defined amount of water is added to this essentially anhydrous organic solution. The ratio of the number of moles of water to the total number of moles of zirconium and yttrium atoms present in the solution (=degree of hydrolysis) preferably lies between 1 and 30.

The sol thus obtained is then left to rest and a gel is observed to slowly form due to aggregation of species produced within the sol. This gelling step may be accelerated by gently heating the sol in an oven, for example at a temperature of between 40 and 80° C.

Once the sol-gel transition has been reached, the liquid phase is removed by drying. The drying technique may have a major influence on the density of the powders obtained.

Thus, drying the gel by simple evaporation of the solvent/water phase at atmospheric pressure and room temperature or in an oven leads to the formation of a xerogel.

In a preferred embodiment, removal of the liquid phase is carried out by supercritical drying in an autoclave, at a temperature above the critical temperature and at a pressure above the critical pressure of the solvent. This type of drying is generally carried out by slowly increasing the temperature and the pressure of the system before depressurizing it at constant temperature after having passed beyond the critical point of the liquid. Supercritical drying of an yttriated zirconia gel prepared in the way described above yields a translucent monolith of very aerated microstructure, called an aerogel.

After mechanical grinding of the xerogel or aerogel, heat treatment of the ground gel at a temperature above 300° C. (serving mainly to remove residual solvent) and optionally a calcination step at a temperature of between 500° C. and 1000° C., nanoscale crystalline particles of spherical geometry having a specific surface area of greater than 50 $m^2/g$, corresponding to the desired nanocrystalline metal-oxide powder, are obtained.

FIG. 1 shows a micrograph, taken using a transmission electron microscope, of the spherical nanocrystalline particles of an aerogel obtained using the synthesis protocol described above and supercritical drying.

Another subject of the present invention is a metal-oxide-based ceramic that can be obtained by the method described above.

By virtue of the judicious choice of both the powder and the sintering technique, the method according to the invention makes it possible to produce very thin wafers having a thickness of 200 μm or less, preferably of 150 μm or less, and even more preferably of between 80 nm and 100 nm, and having an area possibly of between 1 and 50 $cm^2$, preferably between 2 and 50 $cm^2$, and even more preferably between 3 and 50 $cm^2$.

Moreover, the method of the present invention makes it possible to control very easily the degree of densification of the ceramic produced. To be useable as a solid electrolyte in SOFCs, the wafers obtained must be perfectly impermeable to gases. The applicant has observed that such is the case when the porosity of the ceramics was lower than 4%, preferably between 4% and 1%, and in particular between 3 and 1%, determined either by evaluation of the bulk density or by the Archimedes principle. The ceramic that is the subject of the present invention therefore preferably has such porosity.

As indicated in the introduction, the ceramics of the present invention are perfectly suitable for use as solid electrolytes in fuel cells and high-temperature electrolysis cells. Their good strength makes it possible to deposit thereon the other components that make up the cell. Another subject of the present invention is therefore a fuel cell and a high-temperature electrolysis cell comprising a ceramic such as defined above.

Another advantageous application of the ceramics of the present invention is that of electrochemical sensors. Dense and impermeable materials having a porosity of less than 4%, preferably of between 1 and 4%, are indeed perfectly suitable for use as electrochemical probes or sensors in systems for measuring or detecting various compounds such as $O_2$, $NO_x$, $Cl_2$, $CO_2$, CO, $SO_2$, $SH_2$ or $NH_3$. Another subject of the present invention is therefore the use of the ceramic described above as electrochemical sensors, and measurement and/or detection devices comprising such a ceramic as an electrochemical sensor.

Lastly, the ceramics of the present invention are also very advantageous as separating membranes used for almost any sort of filtration. Specifically, the manufacturing method of the present invention makes it possible to perfectly control the porosity of the final material and it is thus easy to vary the porosity and, therefore, the size of the pores depending on the type of filtration it is desired to provide. The ceramics of the present invention can thus be used for:

macrofiltration (pore size larger than 2 μm);
cross-flow or dead-end microfiltration (pore size of between 0.05 μm and 2 μm);
ultrafiltration (pore size of between 50 and 1 nm);
nanofiltration (pore size of between 0.4 and 1 nm); and
reverse osmosis (pore size smaller than 0.4 nm).

Of course, to be able to function as separating membranes, the ceramics of the present invention must not be impermeable but allow selective permeation of the chemical species (atoms, molecules, macromolecules) to be separated.

Therefore, if the ceramics are to be used as separation membranes their porosity must be higher than the range mentioned above for solid-electrolyte or electrochemical-sensor applications.

Furthermore, another subject of the present invention is therefore the use of the ceramics of the present invention preferably having a porosity higher than 4% and ranging up to 30%, preferably between 6 and 25%, as filtration membranes.

In the latter application, the ceramics are remarkable, inter alia, because of their excellent strength, which allows them to be used in pressurized filtration methods, and their good chemical and heat resistance. The good high-temperature withstand of the membranes thus makes effective cleaning possible, for example organic impurities blocking the pores can be burnt off.

EXAMPLE

Self-Supporting Yttria-Stabilized Zirconia Ceramics ($ZrO_2$ 8% $Y_2O_3$)

(a) Synthesis of the oxide powder via the sol-gel route from metal salts:

An acidic aqueous solution containing 1.68 $mol.L^{-1}$ of zirconium nitrate, 0.32 $mol.L^{-1}$ of yttrium nitrate, 0.94 $mol.L^{-1}$ of acetylacetone (ACAC) and 0.94 $mol.L^{-1}$ of hexamethylenetetramine (HMTA) was prepared, the solution having a pH of 3.2. The mixture was heated for 15 minutes at a temperature of 80° C. until a gelled solution having a viscosity of about 40 mPa·s at 25° C. was obtained.

After the gel had been dried and undergone a decomposition treatment at 400° C., under a stream of air, for 7 hours, the amorphous residue was calcined at 800° C. for 2 hours.

A powder, crystallized in the fluorite structure of $F_{m3m}$ space group, consisting of elementary spherical single-crystal particles having an average diameter of 20 nm was obtained. The elementary particles were grouped in highly aerated agglomerates having an average size of 10 μm. The specific surface area of this powder was about 50 $m^2/g$.

(b) Manufacture of the ceramic by flash sintering:

Five layers of powder of yttria-stabilized zirconia, each weighing 0.36 g, were inserted into a cylindrical graphite mould having an inside diameter of 20 mm, the layers being separated from one another by graphite sheets. The assembly was raised to 1200° C., with a temperature ramp-up of 50° C./min, and kept at this temperature for 20 minutes. Once the temperature set point had been reached, a piston was used to apply increasing uniaxial pressure, reaching 100 MPa after 2 minutes, after which this pressure was maintained for 13 minutes. Next, the applied pressure was gradually decreased over 5 minutes until normal pressure was reached while keeping the temperature at 1200° C.

At the end of the pressure reduction, the temperature was gradually decreased at a rate of 20° C./min until room temperature was reached.

The current applied was gradually increased during the heating phase, reaching about 1600 A at the start of compression when the temperature set point (1200° C.) had been reached.

The multilayer of graphite-sheet-separated ceramic wafers was subjected to a heat treatment in air at 700° C. so as to decompose the intermediate graphite sheets.

It was thus possible to manufacture five round self-supporting ceramic wafers less than 200 nm in thickness and 20 mm in diameter having a porosity of less than 2%.

The invention claimed is:

1. Method for manufacturing a metal-oxide-based ceramic solid electrolyte, comprising the following steps:
   (a) inserting, into a flash sintering device, a nanocrystalline powder comprising crystallites and crystallite agglomerates of a ceramic of formula:
   $Zr_{1-x}M_xO_2$, where M is chosen from yttrium, scandium and cerium, or
   $Ce_{1-x}M'_xO_2$, where M' is chosen from gadolinium, scandium, samarium and yttrium, where x lies between 0 and 0.2,
said powder having:
   an average crystallite size, measured by X-ray diffraction, of between 5 and 50 nm (nanometers),
   an average crystallite agglomerate size, measured using a scanning electron microscope (SEM), of between 0.5 and 20 µm (microns),
   a specific surface area, measured using the BET method, of between 20 and 100 m²/g; and
   (b) flash sintering said powder by applying a pressure of between 50 and 150 MPa, at a temperature of between 850° C. and 1400° C., for a period between 5 and 30 minutes.

2. The method according to claim 1, wherein step (a) comprises inserting a plurality of layers of nanocrystalline powder into said flash sintering device, the various layers being separated from one another by a respective separating sheet capable of withstanding the thermal and mechanical conditions of the sintering step (b), so as to obtain, after the sintering step (b), a multilayer of a number of ceramic wafers and separating sheets arranged in alternation.

3. The method according to claim 2, further comprising a step (c) of thermally and/or chemically treating the multilayer obtained after the sintering step (b), step (c) being used to selectively remover-the separating sheets.

4. The method according to claim 2, wherein the separating sheets are graphite sheets and in that step (c) comprises treating the sintered multilayer in air at a temperature of between 700 and 900° C.

5. The method according to claim 1, further comprising a step of synthesizing said powder using a sol-gel technique before inserting step (a).

6. The method according to claim 5, wherein the nanocrystalline powder is synthesized from an acidic aqueous solution of zirconium salts, optionally mixed with a yttrium, scandium or cerium salt, or from an acidic aqueous solution of cerium salts, optionally mixed with a gadolinium, scandium, samarium or yttrium salt, said solution further containing hexamethylenetetramine (HMTA) and acetylacetone (ACAC).

7. The method according to claim 5, wherein the nanocrystalline powder is synthesized by the sol-gel route from a tetraalkoxyzirconium compound and an yttrium salt in the presence of a chelating agent.

8. The method according to claim 1, wherein the temperature of step (b) lies between 1000° C. and 1300° C.

9. The method according to claim 1, wherein the pressure applied in step (b) lies between 80 and 120 MPa.

10. The method according to claim 1, wherein the duration of step (b) lies between 10 and 30 minutes.

11. A metal-oxide-based ceramic that can be obtained by the method according to claim 1.

12. A ceramic according to claim 11, wherein it is a wafer having a thickness of 200 µm or less and an area of between 1 and 100 cm².

13. A ceramic according to claim 11, wherein it has a porosity of between 4% and 1%.

14. A fuel cell comprising a ceramic according to claim 13 as a solid electrolyte.

15. A high-temperature electrolysis cell comprising a ceramic according to claim 13 as a solid electrolyte.

16. A measurement and/or detection device comprising a ceramic according to claim 13 as an electrochemical sensor.

17. A ceramic according to claim 11, wherein it has a porosity greater than 4% and ranging up to 30%.

18. A method of filtration wherein the filtration membrane is a ceramic according to claim 17.

* * * * *